United States Patent
Strinati et al.

(10) Patent No.: US 8,737,309 B2
(45) Date of Patent: May 27, 2014

(54) DATA PACKET TRANSMISSION PROCESS BASED ON A HARQ SCHEME FOR MINIMIZING TRANSMISSION POWER

(75) Inventors: Emilio Calvanese Strinati, Grenoble (FR); Rohit Gupta, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 133 days.

(21) Appl. No.: 13/553,590

(22) Filed: Jul. 19, 2012

(65) Prior Publication Data

US 2013/0039270 A1    Feb. 14, 2013

(30) Foreign Application Priority Data

Jul. 20, 2011 (FR) ...................... 11 56587

(51) Int. Cl.
*H04W 4/00* (2009.01)
(52) U.S. Cl.
USPC ............ 370/328; 370/329; 370/252; 370/342
(58) Field of Classification Search
None
See application file for complete search history.

(56) References Cited

U.S. PATENT DOCUMENTS

| | | | | |
|---|---|---|---|---|
| 7,778,197 | B2* | 8/2010 | Kim | 370/252 |
| 2002/0027897 | A1* | 3/2002 | Moulsley et al. | 370/342 |
| 2005/0243762 | A1* | 11/2005 | Terry et al. | 370/328 |
| 2006/0128318 | A1* | 6/2006 | Agarossi et al. | 455/69 |
| 2008/0043703 | A1* | 2/2008 | Choi et al. | 370/342 |
| 2008/0080464 | A1* | 4/2008 | Speight | 370/342 |
| 2009/0150740 | A1* | 6/2009 | Iwai et al. | 714/751 |
| 2011/0032897 | A1* | 2/2011 | Ihm et al. | 370/329 |
| 2011/0051657 | A1* | 3/2011 | Li et al. | 370/328 |
| 2011/0167312 | A1* | 7/2011 | Ogawa et al. | 714/749 |
| 2012/0314667 | A1* | 12/2012 | Taoka et al. | 370/329 |

FOREIGN PATENT DOCUMENTS

| | | |
|---|---|---|
| EP | 1 924 018 A1 | 5/2008 |
| WO | WO 02/17548 A1 | 2/2002 |
| WO | WO 2004/025870 A1 | 3/2004 |

* cited by examiner

*Primary Examiner* — Ian N Moore
*Assistant Examiner* — Lakeram Jangbahadur
(74) *Attorney, Agent, or Firm* — Blakely Sokoloff Taylor & Zafman

(57) ABSTRACT

The invention relates to a data packet transmission process in a communication system comprising at least one terminal (UE) communicating with a base station (BS), the process comprising at least one transmission (S4) of the data packet with a given power, from the terminal to the base station based on a HARQ scheme to obtain a residual packet error rate $PER_{res}$ after a number of transmissions $Tr_n$, the process being characterized in that it comprises a step (S) for the joint selection of the following parameters:
 the number of transmissions $Tr_n$;
 the target packet error rate $PER_{tg}(i)$ of each transmission i, where $i=1, \ldots, Tr_n$, to arrive at the residual packet error rate $PER_{res}$; and
 the modulation and coding scheme m corresponding to each target packet error rate $PER_{tg}(i)$ so as to minimize the data packet transmission power.

10 Claims, 3 Drawing Sheets

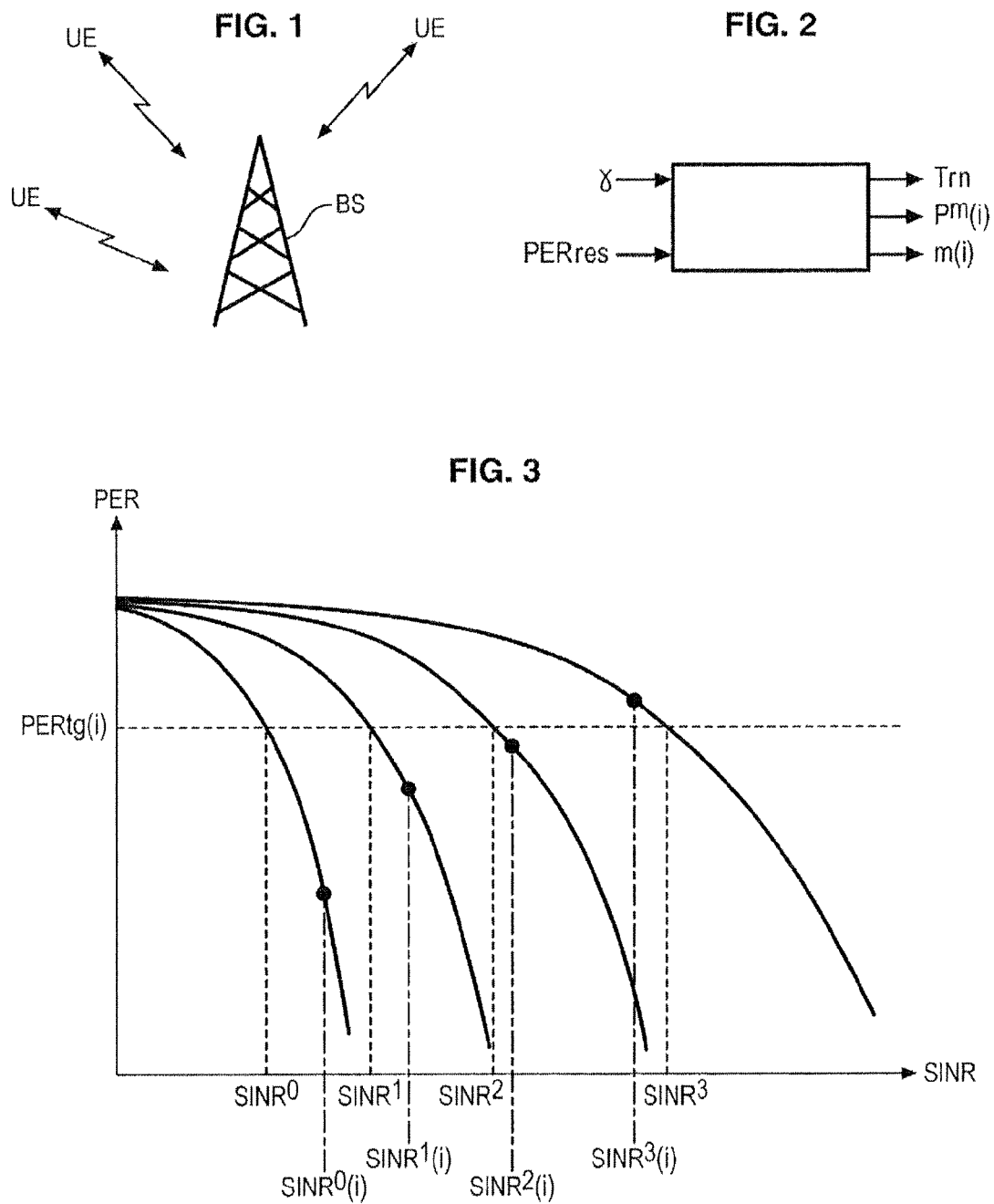

FIG. 4

| m | Modulation | Coding | Spectral efficiency (bits/sec/Hz) | Packet size (bits) |
|---|---|---|---|---|
| 1 | QPSK | 1/3 | 2/3 | 96 |
| 2 | QPSK | 1/2 | 1 | 144 |
| 3 | QPSK | 2/3 | 4/3 | 192 |
| 4 | 16-QAM | 1/3 | 4/3 | 192 |
| 5 | QPSK | 3/4 | 3/2 | 216 |
| 6 | 16-QAM | 1/2 | 2 | 288 |
| 7 | 64-QAM | 1/3 | 2 | 288 |
| 8 | 16-QAM | 2/3 | 8/3 | 384 |
| 9 | 16-QAM | 3/4 | 3 | 432 |
| 10 | 64-QAM | 1/2 | 3 | 432 |
| 11 | 64-QAM | 2/3 | 4 | 576 |
| 12 | 64-QAM | 3/4 | 9/2 | 648 |

DATA PACKET TRANSMISSION PROCESS BASED ON A HARQ SCHEME FOR MINIMIZING TRANSMISSION POWER

FIELD OF THE INVENTION

The invention relates to the field of wireless telecommunication systems and more specifically that of link adaptation telecommunication systems.

STATE OF THE RELATED ART

In a wireless telecommunication system, the quality of the signal received by a terminal is dependent on a number of factors. To maximise the throughput rate and the overall system capacity, the characteristics of the signal to be transmitted may be modified to account for variations in transmission channel quality. This modification mechanism is known as link adaptation.

A well-known means for adapting a link in a wireless telecommunication system is that of using adaptive modulation and coding (AMC), in other words, selecting a modulation and coding scheme (MCS) based on the channel quality. This means is particularly used in the physical layer of 3GPP HSxPA and ETSI HIPERLAN/2 systems.

Typically, for a low signal-to-noise ratio on the transmission channel, a code with a low efficiency (i.e. a high redundancy ratio) and/or a low degree of modulation (i.e. a small cluster) is adopted. Conversely, if the transmission channel has a high signal-to-noise ratio, the throughput rate is maximised by selecting a code with a high efficiency and high degree of modulation. The signal-to-noise ratio (SNR) or signal-to-interference-plus-noise ratio (SINR) is generally estimated by the receiver using pilot symbols and an estimation of the channel propagation coefficients. Reference may be made, for example, to the document A. J. Goldsmith and S. Chua, "Adaptive coded modulation for fading channels", in IEEE Trans. On Communications, 1998.

To remedy channel fading on the transmission channel, it is known to make use of a Hybrid Automatic Repeat reQuest (HARQ) mechanism: if the receiver receives an incorrect packet, a negative acknowledgement (HACK) is returned to the transmitter and the packet is retransmitted. There are different types of HARQ protocol, particularly based on whether the packet is retransmitted as is or additional parity bits are only transmitted (incremental redundancy).

The AMC adaptive scheme on the physical layer may be combined with the HARQ mechanisms on the data link layer. This is referred to as a cross-layer design. In such a case, a first adaptation is carried out on the physical layer by selecting the MCS scheme based on the SINR measured by the receiver to arrive at a given target packet error rate. A second, finer, adaptation is carried out on the data link layer by sending retransmission requests. The cross-layer design makes it possible to reduce the number of MCS schemes in the AMC adaptive mechanism. An example of cross-layer adaptation can be found in the document E. Calvanese Strinati et al.: "Performance evaluation of some hybrid ARQ schemes in IEEE 802.11a networks" published in Proceedings of the IEEE Vehicular Technology 25 Conference, Spring, vol. 4, pages 2735-2739, April 2003.

One problem with a mechanism of this type is that it is costly in terms of transmission power since no adaptation of this parameter is carried out.

DESCRIPTION OF THE INVENTION

The invention makes it possible to remedy the above-mentioned drawbacks by proposing to optimise the transmission power in a cross-layer adaptive mechanism.

According to a first aspect, it relates to a data packet transmission process in a communication system comprising at least one terminal communicating with a base station (BS), the process comprising at least one transmission of the data packet with a given power, from the terminal to the base station based on a HARQ scheme to obtain a residual packet error rate $PER_{res}$ after a number of transmissions $Tr_n$.

The method according to the invention is characterised in that it comprises a step for the joint selection of the following parameters:
- the number of transmissions $Tr_n$;
- the target packet error rate $PER_{tg}(i)$ of each transmission i, where $i=1, \ldots, Tr_n$, to arrive at the residual packet error rate $PER_{res}$; and
- the modulation and coding scheme m corresponding to each target packet error rate $PER_{tg}(i)$ so as to minimise the data packet transmission power.

In addition, the process according to the invention may comprise one or more of the following features:
- the data packet is transmitted on a transmission resource and wherein the selection of the modulation and coding scheme m corresponding to each target packet error rate $PER_{tg}(i)$ is such that the signal-to-interference-plus-noise ratio $SINR^m(i) \leq P^m(i) \cdot \gamma$ where $P^m(i)$ is the transmission power required for the transmission i and $\gamma$ is an indicator of the propagation channel quality;
- two packets from two successive transmissions i,i+1 are combined and wherein the selection of the modulation and coding scheme m corresponding to each target packet error rate $PER_{tg}(i)$ is such that the transmission signal-to-interference-plus-noise ratio and the power $P^m(i)$ required for the transmission i are linked by the following equation $$\sum_{j=1}^{i} P^m(j)\gamma \geq SINR^m(i)$$

where $\gamma$ is an indicator of the propagation channel quality;
- the number of transmissions $Tr_n > 2$, the process comprising a step for determining the transmission channel quality indicator before each transmission $i > 1$ and a step for updating the number of transmissions $Tr_n$; the target packet error rate $PER_{tg}(i)$ of each transmission i, where $i=2, \ldots, T_r$, to arrive at the residual packet error rate $PER_{res}$; the modulation and coding scheme m corresponding to each target packet error rate $PER_{tg}(i)$;
- the target packet error rate of the transmission $i=1$ is greater than the target packet error rate of the transmission $i > 1$;
- the propagation channel quality indicator is the standardised signal-to-interference-plus-noise ratio corresponding to a transmission of pilot symbols on the transmission resource.
- the target packet error rate $PER_{tg} = [PER_{tg}(1), \ldots, PER_{tg}(i), \ldots, PER_{tg}(Tr_n)]$ verifies the constraint: $PER_{tg}(i) > PER_{tg}(i+1) > \ldots > PER_{tg}(Tr_n)$;
- the target packet error rate $PER_{tg}(i)$ at each transmission i is such that $$PER_{res} \leq \prod_{i=1}^{Tr_n} PER_{tg}(i);$$

the number of transmissions $Tr_n$ and the target packet error rate $PER_{tg}(i)$ at each transmission i minimises the data packet transmission power $P_{avg}$ defined by the following function $$P_{avg} = \sum_{i=1}^{Tr_n} \left\{ P^m(i) \prod_{k=0}^{i-1} PER_{tg}^m(k) \right\}$$

based on a modulation and coding scheme m corresponding to each target packet error rate $PER_{tg}(i)$;
  the residual packet error rate $PER_{res}$ is less than $10^{-4}$;
  the telecommunication system is a frequency-division multiple-access OFDM system, each resource being a frequency interval.

DESCRIPTION OF THE FIGURES

Further features and advantages of the invention will emerge from the following description which is purely illustrative and not limiting and should be read with reference to the appended figures wherein
  FIG. 1 schematically illustrates a telecommunication system according to the invention;
FIG. 2 schematically illustrates an embodiment of the process according to the invention;
FIG. 3 illustrates packet error rate curves as a function of the signal-to-interference-plus-noise ratio;
FIG. 4 illustrates parameters of various modulation schemes.

DETAILED DESCRIPTION OF THE INVENTION

Figure 5A:
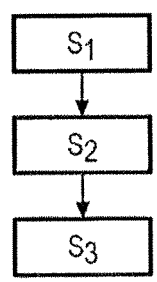
FIGS. 5a, 5b, 5c and 5d schematically illustrate two embodiments of a process according to the invention.

A link adaptation wireless telecommunication system comprising at least one terminal UE communicating with a base station BS will now be described. FIG. 1 schematically illustrates such a system.

Each terminal UE has a given transmission power for transmitting a data packet on a transmission resource.

The telecommunication system is, for example, an OFDM (Orthogonal Frequency Division Multiplexing) system. Each terminal UE is allocated one or a plurality of frequency intervals, each interval consisting of a set of frequency chunks for a plurality of OFDM symbol times for transmitting a data packet.

In this case, the transmission resource is a frequency interval.

The transmission channel parameters between a terminal UP and the base station BS are assumed to be known. This information particularly consists of the channel coefficients for each transmission resource and accounts for multiple path loss.

Such parameters are assumed to be estimated using methods known to those skilled in the art and will not be described in further detail.

It is also assumed that the transmission resources are allocated at the base station BS and notified to each user, i.e. each terminal UE. Once this allocation has been carried out, each terminal will determine the power required to send a data packet on the transmission resource.

The transmission of a data packet on the transmission resource is carried out according to a HARQ transmission scheme.

According to such a scheme, a packet transmission i=1 may be followed by one or a plurality of retransmissions i=2, ..., $Tr_n$ of the same data packet such that, following the transmissions/retransmissions $Tr_n$, the packet is transmitted with a packet error rate less than or equal to a residual packet error rate $PER_{res}$.

To be below the residual packet error rate $PER_{res}$, the parameters of each data packet transmission/retransmission i are defined on the basis of a target packet error rate $PER_{tg}(i)$ for each transmission/retransmission i. The choice of packet error rate $PER_{tg}(i)$ determines a plurality of transmission parameters.

If each transmission/retransmission is considered to be an independent random process, this gives $$PER_{res} \leq \prod_{i=1}^{Tr_n} PER_{tg}(i).$$

For each target packet error rate $PER_{tg}(i)$, the data packet transmission is based on a modulation and coding scheme m(i).

The choice of modulation and coding scheme m(i) is thus dependent on the target packet error rate $PER_{tg}(i)$ and the signal-to-interference-plus-noise ratio associated with the transmission power and transmission channel quality.

The channel quality may be estimated with the estimated signal-to-noise ratio $$\gamma = \frac{|H|^2}{\sigma_n^2} \cdot P$$

where H corresponds to the transmission channel coefficients, $\sigma^2$ the noise power, on the transmission resource used for data packet transmission and P the transmitted signal power.

On the basis of this estimated parameter, it is possible to determine the modulation and coding scheme m(i) using packet error rate curves as illustrated in FIG. 3. In this figure, it is noted that, for a target packet error rate $PER_{tg}$, a plurality of modulation schemes m are possible (corresponding to the same number of curves) for a plurality of minimal SINR values. Such curves are suitable for deducing the minimal SINR to arrive at a target packet error rate.

FIG. 4 illustrates a plurality of parameters based on the order of the selected modulation scheme.

The selection of the parameters of each data packet transmission/retransmission i is suitable for minimising the power required for data packet transmission to obtain a residual packet error rate $PER_{res}$ defined on the basis of a quality of service (QOS) to be obtained.

The residual packet error rate is for example set to $PER_{res}=10^{-4}$ for WIFI (Wireless Fidelity) 802.11 a/b/e, LTE (Long Term Evolution), LTE-A (Long Term Evolution—Advanced) and HSDPA (High Speed Downlink Packet Access) systems.

It consists of the joint selection S of the following parameters, so as to minimise the data packet transmission power:
  the number of transmissions $Tr_n$;
  the target packet error rate $PER_{tg}(i)$ of each transmission i, where i=1, ..., $Tr_n$, to arrive at the residual packet error rate $PER_{tg}$; and modulation and coding scheme m corresponding to each target packet error rate $PER_{tg}(i)$.

Unlike the conventional HARQ transmission scheme, the target packet error rate may be modified at each transmission/retransmission. The only requirement is that of achieving the residual packet error rate $PEP_{res}$ following the data packet transmission/retransmission.

Figure 5B:
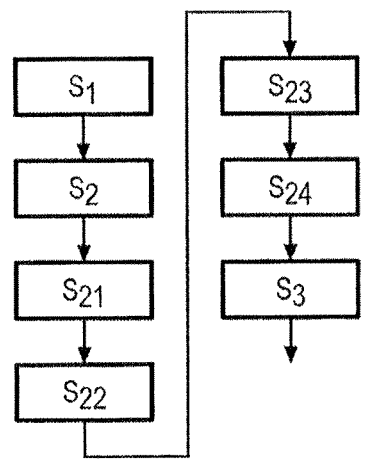
Figure 5C:
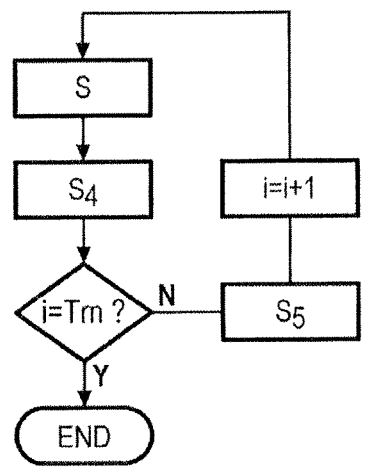
Figure 5D:
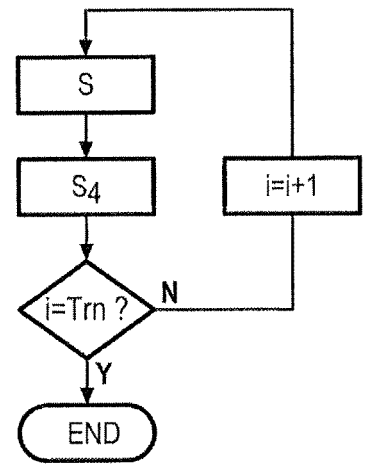

The joint selection S of these parameters may be carried out in a plurality of ways. FIGS. 5 5a, 5b, 5c and 5d schematically illustrate the steps of the process according to various embodiments.

First Embodiment

According to a first embodiment, a target packet error vector may be defined such that the target packet error rate of the transmission i=1 is significant so as to select a high-order modulation scheme m(i). It should be noted that the higher the order, the greater the efficiency.

For example, the target packet error rate at each transmission may be $PER_{tg}$=[0.4 0.2 0.0001 0.00001] to arrive at a packet error rate $PER_{res}$<10$^{-9}$.

According to this embodiment, the transmission is carried out with a high risk of errors, but having a broad spectral efficiency, while minimising the transmission power.

One alternative embodiment is that of selecting the modulation and coding scheme m(i) corresponding to each target packet error rate $PER_{tg}$(i) such that the signal-to-interference-plus-noise ratio SINR(i)=$P^m$(i)γ is minimal where $P^m$(i) is the transmission power required for the transmission/retransmission i and γ.

In this way, to arrive at the target packet error rate of each transmission/retransmission, the modulation and coding scheme requiring a low transmission power is selected.

A further alternative embodiment of the first embodiment is that of selecting a significant target packet error rate for the transmission i=1 so as to obtain a broad spectral efficiency and keep the target packet error rate identical for each transmission i>1.

Second Embodiment

According to a second embodiment, the transmission parameters may be selected by minimising the following function:

$$P_{avg} = \sum_{i=1}^{Tr_n} \left\{ P^m(i) \prod_{k=0}^{i-1} PER_{tg}^m(k) \right\}$$

where $P^m$(i) is the power required for the transmission i based on a modulation and coding scheme m corresponding to the target packet error rate $PER_{tg}$(i).

The problem of minimising this function may be defined as follows:

$$\min_{m, Tr_n, P^m(i)}$$

$P_{avg}^m$ such that $1 \leq i \leq Tr_n$ given that
$P^m(i) \leq P_{max}$,
where $P_{max}$ is the power available to the terminal SE for a transmission/retransmission i.

The above function may be minimised by the following sequence of steps.

Step S1: a target packet error rate vector $PER_{tg}$=[$PER_1$ $PER_2$ ... $PER_n$] is initialised, the vector size being η.

Step S2: for each component of the target packet error rate vector initialised in step S1, the modulation and coding scheme m(i) is determined to arrive at the minimal $SINR^m$(i)=$P^m$(i)γ given $PER_{tg}$(i).

Step S3: the combination of $PER_{tg}$(i) to arrive at the minimal power is selected such that:

$$PER_{res} \leq \prod_{i=1}^{Tr_n} PER_{tg}(i)$$

and $PER_{tg}$(i)>$PER_{tg}$(i+1)> ... >$PER_{tg}$($Tr_n$).

The implementation of step S3 means testing all the possibilities.

To simplify the minimisation after the step S2, the following sub-steps may be implemented.

Step S21: during this step, the values of SINR(i) ing the following constraint are selected: $SINR_{tg}^m$(i)≤γ$P_{max}$. In this way, the complexity of the minimisation problem is reduced.

The size of the target packet error rate is reduced significantly.

Step S22: once the target packet error rate vector has been reduced, a sequence of permutations is implemented to obtain a matrix wherein each line corresponds to a target packet error rate vector.

Step S23: the lines not suitable for obtaining the following constraint $$PER_{res} \leq \prod_{i=1}^{Tr_n} PER_{tg}(i)$$

are deleted.

Step S24: finally, the lines not verifying the following constraint are deleted: $PER_{tg}$(i)>$PER_{tg}$(i+1)> ... >$PER_{tg}$($Tr_n$).

Step S3 consisting of selecting the target packet error rate vector minimising $P_{avg}$ is then implemented.

Third Embodiment

According to a third embodiment for a number of transmissions $Tr_n$>2, the process may comprise, following each transmission S4, a step S5 for determining the transmission channel quality indicator and a step for updating the number of transmissions $Tr_n$; the target packet error rate $PER_{tg}$(i) of each transmission i, where i=2, ..., $T_r$, to arrive at the residual packet error rate $PER_{res}$; and the modulation and coding scheme m corresponding to each target packet error rate $PER_{tg}$(i). In other words, after each transmission, the selection step S is reimplemented.

In this way, the various parameters are updated dynamically during data packet transmission.

The invention claimed is:
1. Data packet transmission process in a communication system comprising:
communicating from at least one terminal (UE) communicating to a base station (BS),
transmitting of the data packet with a given power, from the terminal to the base station based on a HARQ scheme to obtain a residual packet error rate $PER_{res}$ after a number of transmissions $Tr_n$, jointly selecting of the following parameters:
the number of transmissions $Tr_n$;
the target packet error rate $PER_{tg}(i)$ of each transmission i, where $i=1, \ldots, Tr_n$, to arrive at the residual packet error rate $PER_{res}$; and
the modulation and coding scheme m corresponding to each target packet error rate $PER_{tg}(i)$ so as to minimise the data packet transmission power,
wherein the data packet is transmitted on a transmission resource and wherein the selection (S) of the modulation and coding scheme m corresponding to each target packet error rate $PER_{tg}(i)$ is such that the signal-to-interference-plus-noise ratio $SINR^m(i) \leq P^m(i) \cdot \gamma$ where $P^m(i)$ is the transmission power required for the transmission i and $\gamma$ is an indicator of the propagation channel quality.

2. Process according to claim 1 wherein two packets from two successive transmissions i,i+1 are combined and wherein the selection (S) of the modulation and coding scheme m corresponding to each target packet error rate $PER_{tg}(i)$ is such that the transmission signal-to-interference-plus-noise ratio and the power $P^m(i)$ required for the transmission i are linked by the following equation $$\sum_{j=1}^{i} P^m(j)\gamma \geq SINR^m(i)$$

where $\gamma$ is an indicator of the propagation channel quality.

3. Process according to claim 1 wherein the number of transmissions $Tr_n > 2$, the process comprising a step (S5) for determining the transmission channel quality indicator before each transmission i>1 and a step for updating the number of transmissions $Tr_n$; the target packet error rate $PER_{tg}(i)$ of each transmission i, where $i=2, \ldots, Tr$, to arrive at the residual packet error rate $PER_{res}$; the modulation and coding scheme m corresponding to each target packet error rate $PER_{tg}(i)$.

4. Process according to claim 1 wherein the target packet error rate of the transmission i=1 is greater than the target packet error rate of the transmission i>1.

5. Process according to claim 1 wherein the propagation channel quality indicator is the standardised signal-to-interference-plus-noise ratio corresponding to a transmission of pilot symbols on the transmission resource.

6. Process according to claim 1 wherein the target packet error rate $PER_{tg}=[PER_{tg}(1), \ldots, PER_{tg}(i), \ldots, PER_{tg}(Tr_n)]$ verifies the constraint: $PER_{tg}(i) > PER_{tg}(i+1) > \ldots > PER_{tg}(Tr_n)$.

7. Process according to claim 1 wherein the target packet error rate $PER_{tg}(i)$ at each transmission i is such that $$PER_{res} \leq \prod_{i=1}^{Tr_n} PER_{tg}(i).$$

8. Process according to claim 1 wherein the number of transmissions $Tr_n$ and the target packet error rate $PER_{tg}(i)$ at each transmission i minimises the data packet transmission power $P_{avg}$ defined by the following function $$P_{avg} = \sum_{i=1}^{Tr_n} \left\{ P^m(i) \prod_{k=0}^{i-1} PER_{tg}^m(k) \right\}$$

based on a modulation and coding scheme m corresponding to each target packet error rate $PER_{tg}(i)$.

9. Process according to claim 1 wherein the residual packet error rate $PER_{res}$ is less than $10^{-4}$.

10. Process according to claim 1 wherein the telecommunication system is a frequency-division multiple-access OFDM system, each resource being a frequency interval.

* * * * *